United States Patent [19]

Stripling

[11] 4,133,349
[45] Jan. 9, 1979

[54] CONDITION RESPONSIVE BY-PASS VALVE CONSTRUCTION AND METHOD OF MAKING THE SAME

[75] Inventor: Stephen J. Stripling, Knoxville, Tenn.

[73] Assignee: Robertshaw Controls Company, Richmond, Va.

[21] Appl. No.: 800,300

[22] Filed: May 25, 1977

[51] Int. Cl.² ............................................. G05D 16/00
[52] U.S. Cl. .................................. 137/882; 123/41.12; 251/324
[58] Field of Search ......................... 137/882, 82, 625.3, 137/625.37; 251/11, 205, 122; 236/86, 100, 101 C; 123/41.12

[56] References Cited

U.S. PATENT DOCUMENTS

| | | | |
|---|---|---|---|
| 2,503,922 | 4/1950 | Schumacher | 137/882 |
| 2,649,273 | 8/1953 | Honegger | 251/122 |
| 3,064,676 | 11/1962 | Baker | 137/625.37 |
| 3,317,184 | 5/1967 | Usry | 251/122 |
| 3,791,413 | 2/1974 | Muller et al. | 137/625.3 |
| 3,902,663 | 9/1975 | Elmer | 251/324 |
| 3,961,606 | 6/1976 | Wong | 123/41.12 |

FOREIGN PATENT DOCUMENTS 2341355 2/1975 Fed. Rep. of Germany ............ 236/86
350520 11/1960 Switzerland ........................... 251/122

Primary Examiner—Martin P. Schwadron
Assistant Examiner—A. Michael Chambers
Attorney, Agent, or Firm—Candor, Candor & Tassone

[57] ABSTRACT

A condition responsive by-pass valve construction having a housing provided with an inlet and two outlets interconnected to the inlet, the housing having a valve seat disposed between one of the outlets and the inlet. The housing carries a movable valve member for controlling the valve seat to provide substantially a linear percentage by-pass flow between the inlet and the one outlet as the valve member moves between a fully opened position thereof and a fully closed position thereof. The housing carries a condition responsive device for controlling movement of the valve member. One of the valve seat and the valve member has tapered groove means for progressively bridging and unbridging the other of the valve seat and valve member to provide the substantially linear percentage by-pass flow.

10 Claims, 5 Drawing Figures

CONDITION RESPONSIVE BY-PASS VALVE CONSTRUCTION AND METHOD OF MAKING THE SAME

This invention relates to an improved condition responsive by-pass valve construction and method of making the same.

A condition responsive by-pass valve construction has been provided to cause substantially a linear percentage by-pass flow between an inlet thereof and one of the outlets thereof as a valve member means of the construction moves between a fully opened position thereof and a fully closed position thereof, such construction having a sliding valve member that covers or uncovers a series of aligned bleed openings to provide for the linear percentage by-pass flow.

However, it has been found according to the teachings of this invention that a more accurate linear percentage by-pass flow can be provided if one of the valve member means and the valve seat means therefor is provided with tapered groove means for progressively bridging and unbridging the other of the valve seat means and the valve member means to provide the substantially linear percentage by-pass flow.

In particular, one embodiment of this invention provides a condition responsive by-pass valve construction having a housing means provided with an inlet and two outlets interconnected to the inlet, the housing means having a valve seat means disposed between one of the outlets and the inlet. The housing means carries a movable valve member means for controlling the valve seat means to provide substantially a linear percentage by-pass flow between the inlet and the one outlet as the valve member means moves between a fully opened position thereof and a fully closed position thereof. The housing means carries a condition responsive means for controlling movement of the valve member means. One of the valve seat means and the valve member means has tapered groove means for progressively bridging and unbridging the other of the valve seat means and the valve member means to provide the substantially linear percentage by-pass flow.

Accordingly, it is an object of this invention to provide a condition responsive by-pass valve construction having one or more of the novel features of this invention as set forth above or hereinafter shown or described.

Another object of this invention is to provide a method of making such a condition responsive by-pass valve construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein.

Figure 1:
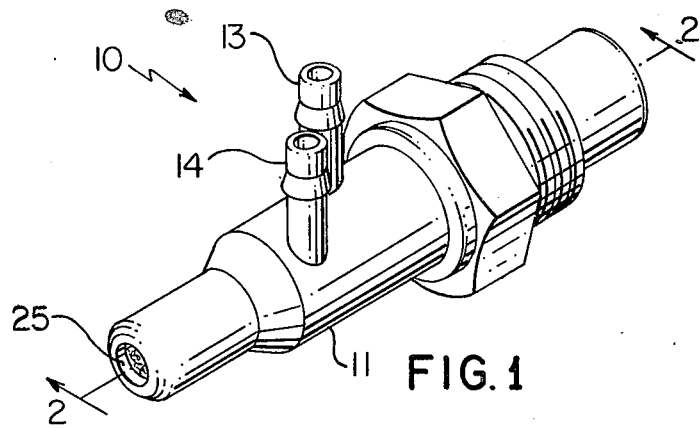
FIG. 1 is a perspective view of the condition responsive by-pass valve construction of this invention.

While the various features of this invention are hereinafter described and illustrated as being particularly adapted to provide a temperature operated by-pass valve construction, it is to be understood that the various features of this invention can be utilized singly or in any combination thereof to provide a by-pass valve construction operated by other means as desired.

Therefore, this invention is not to be limited to only the embodiments illustrated in the drawings, because the drawings are merely utilized to illustrate one of the wide variety of uses of this invention.

Figure 2:
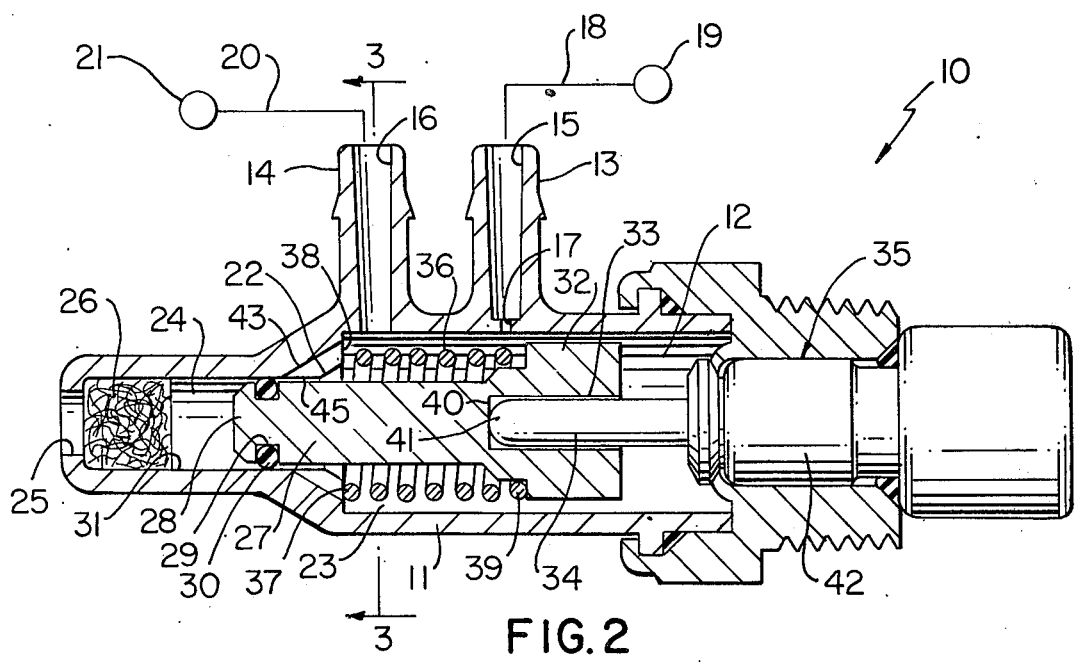
FIG. 2 is an enlarged cross-sectional view taken on line 2—2 of FIG. 1.
Figure 3:
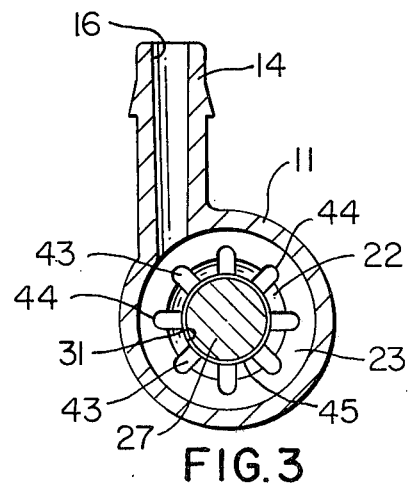
FIG. 3 is a cross-sectional view taken on line 3—3 of FIG. 2.

Referring now to FIGS. 1, 2 and 3, the improved condition responsive by-pass valve construction of this invention is generally indicated by the reference numeral 10 and comprises a housing means 11 having a chamber 12 therein and a pair of nipples 13 and 14 respectively having passage means 15 and 16 therein leading to the chamber 12.

The passage 15 can comprise an inlet to the chamber 12 and has a restriction or orifice 17 therein whereby the inlet 15 is adapted to be interconnected by suitable conduit means 18 to a fluid supply means 19 while the other passage 16 can comprise an outlet that is adapted to be interconnected by suitable conduit means 20 to a fluid utilizing means 21, such as a pneumatically operated control device or the like.

The chamber 12 of the housing means 11 has annular valve seat means 22 therein that leads from a larger cylindrical part 23 of the chamber 12 to a smaller coaxial cylindrical part 24 of the chamber 12 as illustrated, the inlet 15 and outlet 16 both being interconnected to the larger section 23 of the chamber 12 as illustrated.

The smaller cylindrical section 24 of the chamber 12 leads to the atmosphere through a vent outlet 25 and can have suitable filter material 26 disposed therein, if desired.

An axially movable substantially cylindrical valve member 27 is disposed for movement in the chamber 12 and has a forward portion 28 movable through the valve seat means 22 to control the same in a manner hereinafter described, the forward portion 28 of the valve member 27 having an annular groove 29 therein receiving an annular resilient O-ring member 30 which is adapted to slide in sealing engagement with the internal peripheral surface 31 of the housing 11 that defines the smaller cylindrical section 24 of the chamber 12 thereof. Thus, when the O-ring 30 is to the left of the groove means 22 as will be apparent hereinafter, the O-ring member 30 completely blocks and closes the inlet 15 from the outlet 25 so that approximately 100% of the fluid entering the chamber 12 through the inlet 15 is adapted to pass out through the other outlet 16 to the utilization device 21 as will be apparent hereinafter.

The righthand end 32 of the valve member 27 is enlarged and is interrupted by a bore 33 which receives a piston member 34 of a temperature responsive piston and cylinder device that is generally indicated by the reference numeral 35 and which is carried by the housing means 11 as illustrated.

A compression spring 36 is disposed in the chamber 12 and has one end 37 bearing against an annular shoulder 38 of the housing 11 that is formed between the cylindrical sections 23 and 24 thereof and has the other end 39 thereof bearing against the enlarged end 32 of the valve member 27 to tend to urge the valve member 27 to the right in FIG. 2 so that the closed end 40 of the bore 33 of the valve member 27 is maintained in abutment against the end 41 of the piston 34 of the temperature responsive device 35 whereby the position of the valve member 27 in the housing means 11 is determined by the temperature responsive device 35 in a manner hereinafter described.

The temperature responsive device 35 has a cylinder part 42 that receives the piston member 34 therein whereby a wax charge or the like in the cylinder member 42 acts on the piston 34 to extend the same to the left in FIG. 2 as the temperature of the wax charge increases to expand the wax charge and as the temperature of the wax charge decreases, the wax charge contracts and the force of the compression spring 36 moves the piston member 34 to the right in a manner well known in the art.

The annular valve seat means 22 of the housing means 11 has a plurality of tapering grooves 43 formed therein in a circular array and each being angled toward the longitudinal axis of the valve member 27 to intersect thereon at a point that is disposed between the valve seat means 22 and the outlet 25, each groove 43 having an arcuate wall 44 throughout the length thereof as illustrated in FIG. 3 whereby the right hand part 45 of the cylindrical peripheral surface 31 of the housing means 11 is interrupted by the circular array of grooves 43 to permit the opening and closing of the valve seat means 22 by the valve member 27 to provide a substantially linear percentage by-pass flow between the inlet 15 and the outlet 25 as the valve member 27 moves from a fully opened position to a fully closed position in a manner now to be described.

During the operation of the condition responsive by-pass valve construction of this invention, should the temperature being sensed by the device 35 be below a certain temperature whereby the wax charge therein is in its fully contracted condition and the compression spring 36 has moved the valve member 27 to the right so that the O-ring 30 thereof is to the right of the valve seat means 22, substantially 100% of the fluid entering the chamber 12 through the inlet means 15 is adapted to be by-passed by the fully open valve seat means 22 to the outlet 25 whereby substantially zero percent of the fluid in the chamber 12 is directed out of the outlet 16 to the utilization device 21.

Figure 4:
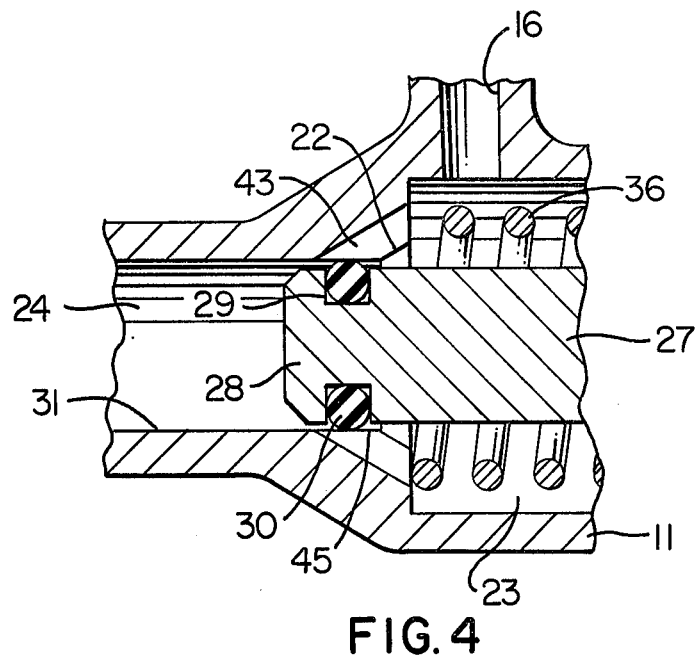
FIG. 4 is an enlarged fragmentary view similar to FIG. 2 and illustrates the condition responsive by-pass valve construction in an intermediate operating condition thereof.

However, as the temperature of the device 35 linearly increases from a certain value to another certain higher value, the wax charge in the device 35 expands and moves the valve member 27 to the left in opposition to the force of the compression spring 36 to cause the O-ring 30 thereof to progressively move from the right hand end of the grooved portion 45 of the valve seat means 22 to the left hand part thereof to progressively close off the grooves 22 in the manner illustrated in FIG. 4 and thereby decrease the amount of fluid flow from the chamber 12 therethrough in substantially a linear manner. Thus, when the O-ring 30 reaches the left hand end of the grooved portion 45 of the valve seat means 22, the valve seat means 22 is completely closed so that no fluid is directed from the inlet 15 to the outlet 25 and substantially 100% of the fluid from the inlet 15 is directed by the outlet 16 to the utilization device 21.

Conversely, as the temperature of the device 35 decreases, the valve member 27 is moved from the position illustrated in FIG. 2 to the right to progressively open the grooved portion 45 of the valve seat means 22 to increase the amount of interconnection between the inlet 15 and the outlet 25 in substantially a linear manner.

Thus, in the above example of the condition responsive by-pass valve construction 10 of this invention, the temperature responsive device 35 has been so selected that the same provides a decreasing by-pass flow to the outlet 25 as the temperature thereof increases through a certain temperature range so that at approximately the lowest temperature of the certain temperature range, the valve member 27 has its O-ring 30 to the right of the grooved portion 45 of the valve seat means 22 to cause substantially 100% of the fluid in the inlet 15 to be by-passed to the outlet 25 whereby substantially zero percent of the fluid from the inlet means 15 passes through the other outlet 16 to the utilization device 21. However, as the temperature of the device 35 increases from substantially the lowest temperature of the certain temperature range to approximately the highest temperature of the certain temperature range, the valve member 30 is progressively moved from the right hand portion of the grooved part 45 of the valve seat means 22 to the left hand part thereof so that the percentage of fluid by-passed from the inlet 15 to the outlet 25 is linearly decreased and the amount of fluid being adapted to pass to the outlet 16 and, thus, to the utilization device 21 increases substantially linearly until at approximately the highest temperature of the certain temperature range, substantially 100% of the fluid from the inlet 15 passes to the utilization device 21 and the valve seat means 22 is completely closed by the valve member 27 having its O-ring 30 completely closing off the grooved portion 45 of the valve seat means 22 from the outlet 25.

Therefore, it can be seen that the condition responsive by-pass valve construction 10 of this invention provides substantially a linear percentage by-pass flow between the inlet 15 and the outlet 25 as the valve member 27 moves between a fully opened position thereof and a fully closed position thereof.

While the valve construction 10 of this invention has been described as having the tapering grooves 43 formed in the valve seat means 22 thereof, it is to be understood that the tapering grooves could be formed in the valve member rather than in the valve seat means thereof.

Figure 5:
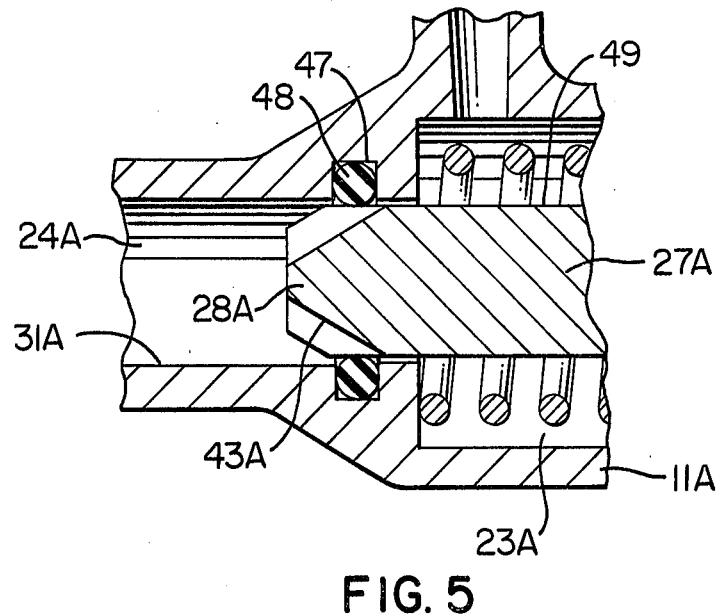
FIG. 5 is a view similar to FIG. 4 and illustrates another embodiment of the condition responsive by-pass valve construction in an intermediate operating condition thereof.

For example, another condition responsive by-pass valve construction of this invention is generally indicated by the reference numeral 10A in FIG. 5 and parts thereof similar to the valve construction 10 previously described are indicated by like reference numerals followed by the reference letter "A".

As illustrated in FIG. 5, the cylindrical portion 24A of the housing means 11A is provided with an annular groove 47 therein which receives an annular resilient O-ring member 48 that projects inwardly from the internal peripheral surface 31A of the housing means 11A to contact against the outer cylindrical peripheral surface 49 of the axially movable valve member means 27A to be opened and closed thereby.

The left hand portion 28A of the valve member means 27A is provided with a plurality of circularly arranged grooves 43A that taper at an angle relative to the longitudinal axis of the valve member means 27A as illustrated in FIG. 5 so that the grooves 43A will be progressively bridging and unbridging the O-ring valve seat member 48 in the same manner that the grooves 43 of the valve seat means 22 were progressively bridging and unbridging the resilient member 30 of the valve member 27 to provide substantially a linear percentage flow between the chamber sections 23A and 24A for the reasons previously set forth.

Therefore, it can be seen that either the valve member means or the valve seat mean of the condition responsive by-pass valve construction of this invention can be made with the tapering groove means to provide for the substantially linear percentage by-pass flow between the inlet of the valve construction and one of the outlets thereof as the valve member means moves between a fully opened position of the valve seat means and a fully closed position of the valve seat means for the reasons previously set forth.

Thus, this invention not only provides an improved condition responsive by-pass valve construction, but also this invention provides a method of making such a condition responsive by-pass valve construction.

While the forms and methods of this invention now preferred have been described and illustrated as required by the Patent Statute, it is to be understood that other forms and method steps can be utilized and still fall within the scope of the appended claims.

What is claimed is:

1. In a condition responsive by-pass valve construction having a housing means provided with an inlet and two outlets interconnected to said inlet, said housing means having a valve seat means disposed between one of said outlets and said inlet, said valve seat means comprising a first cylindrical chamber part of said housing means interconnected by an annular angled surface of said housing means to a second cylindrical chamber part of the housing means that is larger in diameter than said first chamber part, said housing means carrying a movable valve member means for controlling the flow of fluid through said valve seat means to said one of said outlets to provide substantially a linear percentage by-pass flow between said inlet and said one of said outlets as said valve member means moves between a fully opened position thereof and a fully closed position thereof where said valve member means is sealing disposed in said first chamber part, said housing means carrying a condition responsive means for controlling movement of said valve member means, the improvement wherein said annular angled surface of said valve seat means has groove means therein extending between said first chamber part and said second chamber part and intersecting therewith for said valve member means to be progressively bridging and unbridging to provide said substantially linear percentage by-pass flow.

2. A valve construction as set forth in claim 1 wherein said valve member means carries a resilient member that is adapted to bridge and unbridge said groove means.

3. A valve construction as set forth in claim 2 wherein said groove means comprises a plurality of spaced apart grooves.

4. A valve construction as set forth in claim 3 wherein said plurality of grooves are disposed in a circular array.

5. A valve construction as set forth in claim 4 wherein said resilient member comprises an O-ring.

6. A valve construction as set forth in claim 4 wherein said grooves all angle toward a common point.

7. A valve construction as set forth in claim 6 wherein said grooves angle toward said one of said outlets.

8. A valve construction as set forth in claim 1 wherein said valve member means comprises an axially movable plunger adapted to slide partly through said valve seat means as said plunger is moved along a longitudinal axis thereof.

9. A valve construction as set forth in claim 8 wherein said groove means is angled relative to said longitudinal axis.

10. A valve construction as set forth in claim 9 wherein said groove means comprises a plurality of spaced apart grooves disposed in a circular array and each being angled at the same angle relative to said longitudinal axis.

* * * * *